United States Patent
Havinis et al.

(10) Patent No.: US 6,195,557 B1
(45) Date of Patent: Feb. 27, 2001

(54) SYSTEM AND METHOD FOR USE OF OVERRIDE KEYS FOR LOCATION SERVICES

(75) Inventors: Theodore Havinis, Plano; Stephen Hayes, Carrollton; Maya Roel-Ng, Plano, all of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/062,962

(22) Filed: Apr. 20, 1998

(51) Int. Cl.$^7$ .................................................. H04Q 7/20
(52) U.S. Cl. ............................................. 455/456; 455/433
(58) Field of Search ................................. 455/456, 410, 455/411, 433; 342/457

(56) References Cited

U.S. PATENT DOCUMENTS

| 5,485,163 | * | 1/1996 | Singer et al. ........................ 342/457 |
| 5,918,159 | * | 6/1999 | Fomukong et al. ................ 455/38.1 |
| 5,950,137 | * | 9/1999 | Kim ..................................... 455/456 |
| 5,963,866 | * | 10/1999 | Palamara et al. ................... 455/456 |

FOREIGN PATENT DOCUMENTS

| 195 20 632 A1 | 6/1995 | (DE) . |
| 0 290 725 A2 | 2/1988 | (EP) . |
| WO 98/52379 | 11/1998 | (WO) . |

OTHER PUBLICATIONS

PCT International Search Report dated Aug. 24, 1999.

* cited by examiner

Primary Examiner—Dwayne Bost
Assistant Examiner—Erika A. Gary
(74) Attorney, Agent, or Firm—Jenkens & Gilchrist, P.C.

(57) ABSTRACT

A telecommunications system and method is disclosed for implementing Location Override Key(s) (LOKs) within location services in order to determine whether certain checks on subscriber limitations and/or system default behavior are applicable or not for a particular location request. Each LOK can either have the value override or not override associated therewith, and each Location Application (LA) can be associated with a particular value of an LOK. In addition, an LOK can be accompanied by one or more additional parameters related to the particular LOK. For example, location services can provide LAs with a Privacy Override Key (POK), which can have a value of "override" or "not override". If the POK is set to "override", the privacy settings of the subscriber to be positioned shall be overridden for the particular positioning request in most cases only if the subscriber to be positioned is in the same Public Land Mobile Network (PLMN) as the Gateway Mobile Location Center (GMLC) that received the positioning request.

12 Claims, 5 Drawing Sheets

US 6,195,557 B1

SYSTEM AND METHOD FOR USE OF OVERRIDE KEYS FOR LOCATION SERVICES

BACKGROUND OF THE PRESENT INVENTION

1. Field of the Invention

The present invention relates generally to telecommunications systems and methods for determining the location of a mobile terminal within a cellular network, and specifically to allowing a location application to override subscriber limitations and/or system default behavior when positioning, such as subscriber privacy settings and preferred positioning method.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

The VLR 16 is a database containing information about all of the MS's 20 currently located within the MSC/VLR area 12. If an MS 20 roams into a new MSC/VLR area 12, the VLR 16 connected to that MSC 14 requests data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS 20 within a cellular network 10 has recently become important for a wide range of applications. For example, positioning services may be used by transport and taxi companies to determine the location of their vehicles. In addition, for emergency calls, e.g., 911 calls, the exact location of the mobile terminal 20 may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital, e.g., Where am I service.

As can be seen in FIG. 2 of the drawings, upon a network positioning request, the Base Station System (BSS) (220 and 240) serving the MS 200 to be positioned generates positioning data, which is delivered to the MSC 260. This positioning data is then forwarded to a Mobile Location Center (MLC) 270 for calculation of the geographical location of the MS 200. The location of the MS 200 can then be sent to a Location Application (LA) 280 that requested the positioning. Alternatively, the requesting LA 280 could be located within the MS 200 itself, within the MSC/VLR 260 or could be an external node, such as an Intelligent Network (IN) node.

In order to accurately determine the location of the MS 200, positioning data from three or more separate BTS's (210, 220, and 230) is required. This positioning data for GSM systems can include, for example, a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends upon the distance between the MS 200 and the BTS 220. TA values are expressed in bit periods, and can range from 0 to 63, with each bit period corresponding to approximately 550 meters between the MS 200 and the BTS 220.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the MS 200 can be determined (with certain accuracy) by the MLC 270.

It should be understood, however, that any estimate of time, distance, or angle for any cellular system 205 can be used, instead of the TA value discussed herein. For example, the MS 200 can have a Global Positioning System (GPS) receiver built into it, which is used to determine the location of the MS 200. In addition, the MS 200 can collect positioning data based on the Observed Time Difference (OTD) between the time a BTS 220 sends out a signal and the time the MS 200 receives the signal. This time difference information can be sent to the MLC 270 for calculation of the location of the MS 200. Alternatively, the MS 200, with knowledge of the location of the BTS 220, can determine its location.

Existing technology can provide subscribers with the ability to prevent LAs 280 from positioning them in order to protect their privacy. However, in some cases, it is necessary for the specific LA 280 to position the MS 200 regardless of the privacy settings of the particular subscriber. For example, when the LA 280 is an emergency center or a law enforcement agency, the community interest in positioning the MS 200 outweighs the subscriber's need for privacy. In this case, the privacy settings of the subscriber will need to be overridden in order for the emergency center or law enforcement agency to position the MS 200. In addition, LAs 280 may need to have the ability to override other location settings established by the subscriber.

It is, therefore, an object of the invention to implement location override keys within location services in order to bypass subscriber limitations and/or system default behavior when positioning.

It is a further object of the invention to allow location applications to define a privacy override key when registering with a cellular network as users of location services in order to allow positioning of a mobile terminal even if the mobile terminal has a privacy setting associated therewith.

SUMMARY OF THE INVENTION

The present invention is directed to telecommunications systems and methods for implementing Location Override Key(s) (LOKs) within location services in order to ascertain whether certain checks on subscriber limitations and/or system default behavior are applicable or not for a particular location request. Each LOK can either have the value override or not override associated therewith, and each Location Application (LA) can be associated with a particular value of an LOK. An LOK can be accompanied by one or more parameters that carry additional information related to the particular LOK, e.g., a parameter defining the positioning method to be used. For example, a Gateway Mobile Location Center (GMLC) can provide LA's with a Privacy Override Key (POK), which can have a value of "override" or "not override". If the POK is set to "override", the privacy settings of the subscriber to be positioned shall be overridden for the particular positioning request only if the subscriber to be positioned is in the same Public Land Mobile Network (PLMN) as the GMLC that received the positioning request. Otherwise, when the POK with the value "override" is sent by the GMLC to the serving Mobile Location Center (MLC), the serving MLC can either reject positioning all together or can convert the POK to a value of "not override". This avoids jurisdictional conflicts between PLMNs with respect to the ability of LAs to override privacy settings. However, it should be understood that agreements between PLMNs can state that POK values of "override" will be accepted between the PLMNs.

BRIEF DESCRIPTION OF THE DRAWINGS

The disclosed inventions will be described with reference to the accompanying drawings, which show sample embodiments of the invention and which are incorporated in the specification hereof by reference, wherein:

FIG. 5 demonstrates steps in a sample positioning of a mobile terminal within a Public Land Mobile Network (PLMN) different than the PLMN that a Gateway Mobile Location Center, which receives the positioning request from the requesting Location Application, is in.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
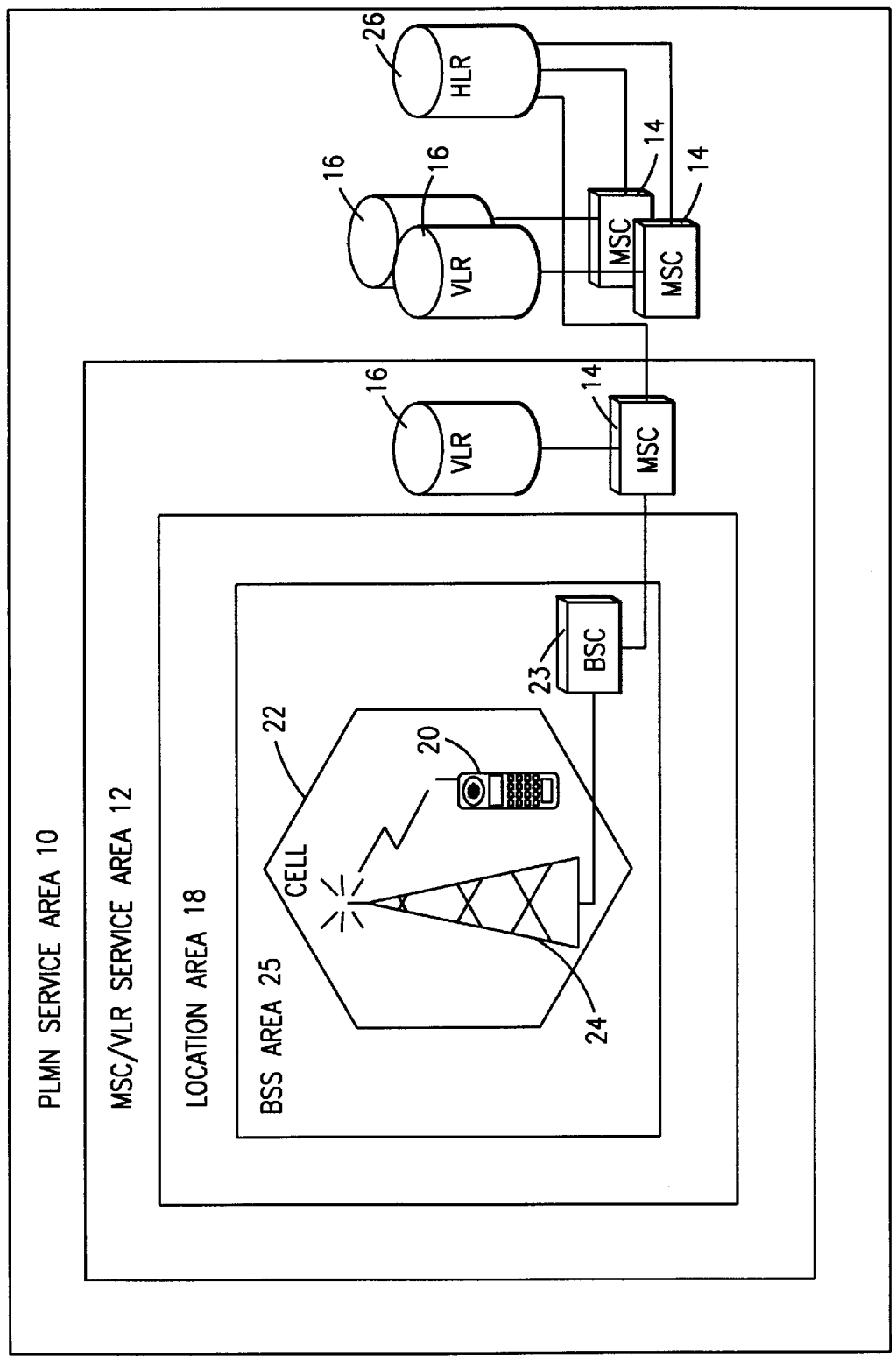
FIG. 1 is a block diagram of a conventional terrestrially-based wireless telecommunications system.
Figure 2:
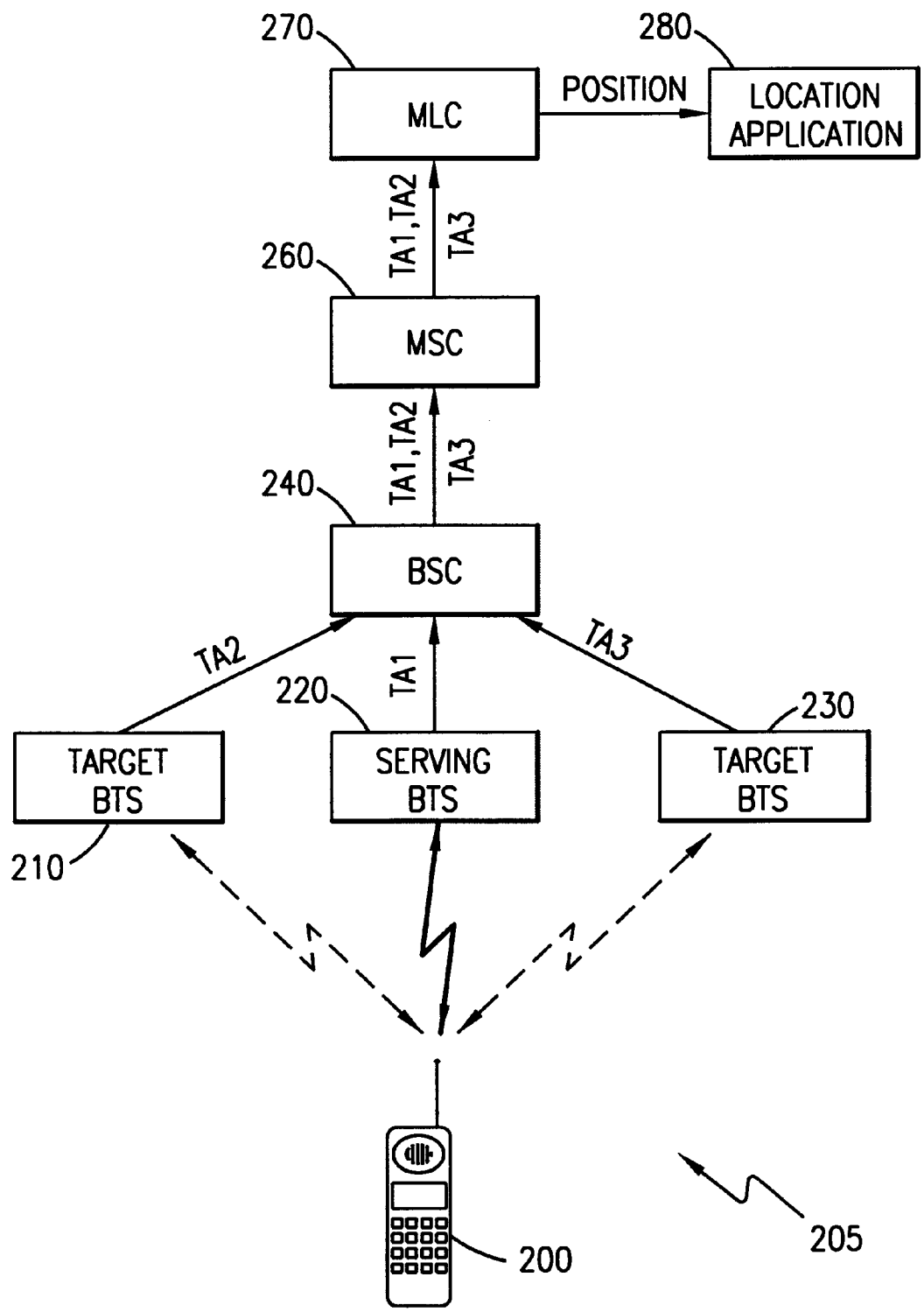
FIG. 2 illustrates a sample positioning handover in which positioning data is acquired by a target base transceiver station and transmitted to a serving base station controller.
Figure 3:
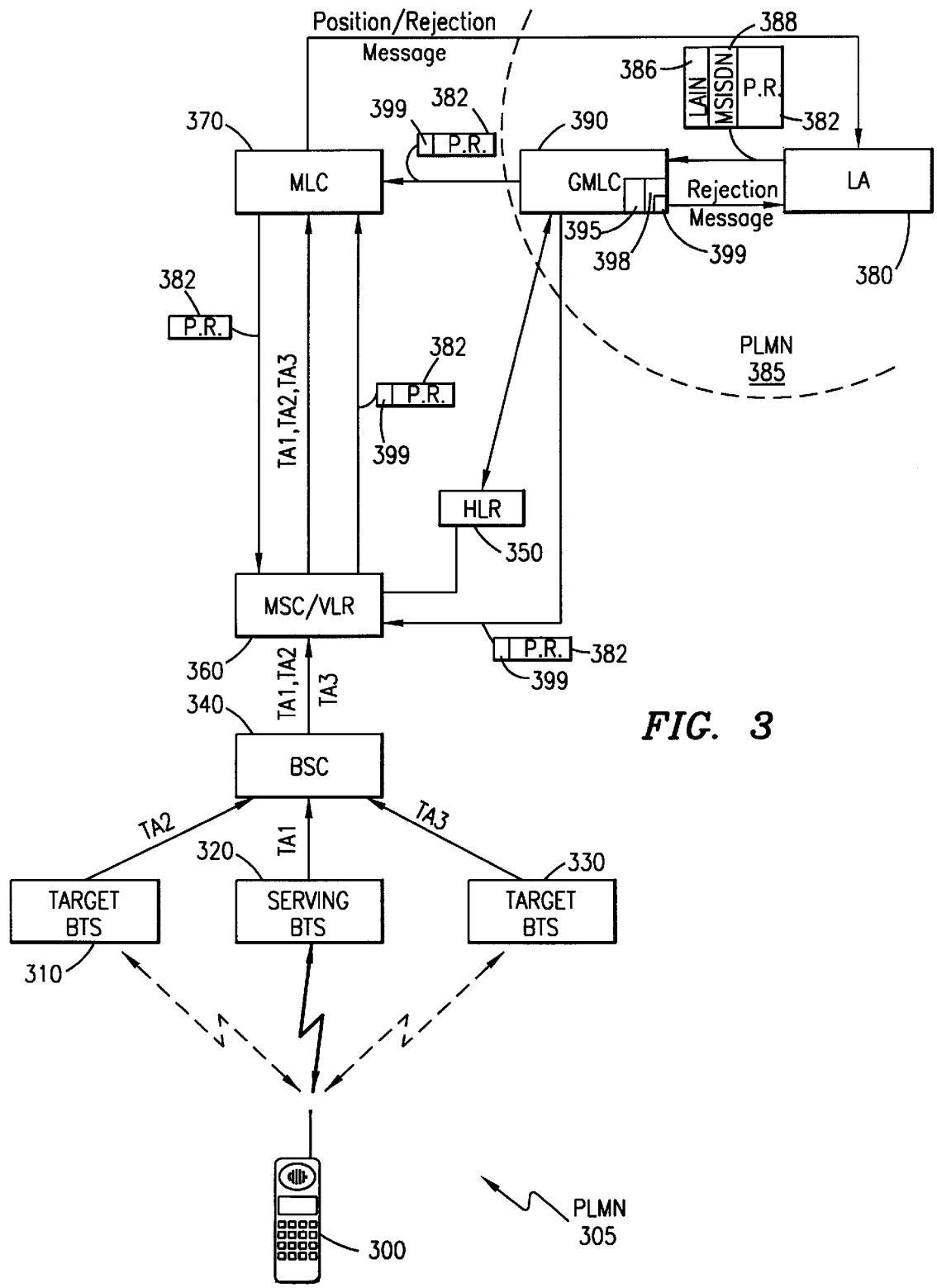
FIG. 3 is a block diagram depicting the positioning of a mobile terminal within a cellular network depending upon the values of Location Override Keys associated with a requesting Location Application in accordance with preferred embodiments of the present invention.
Figure 4:
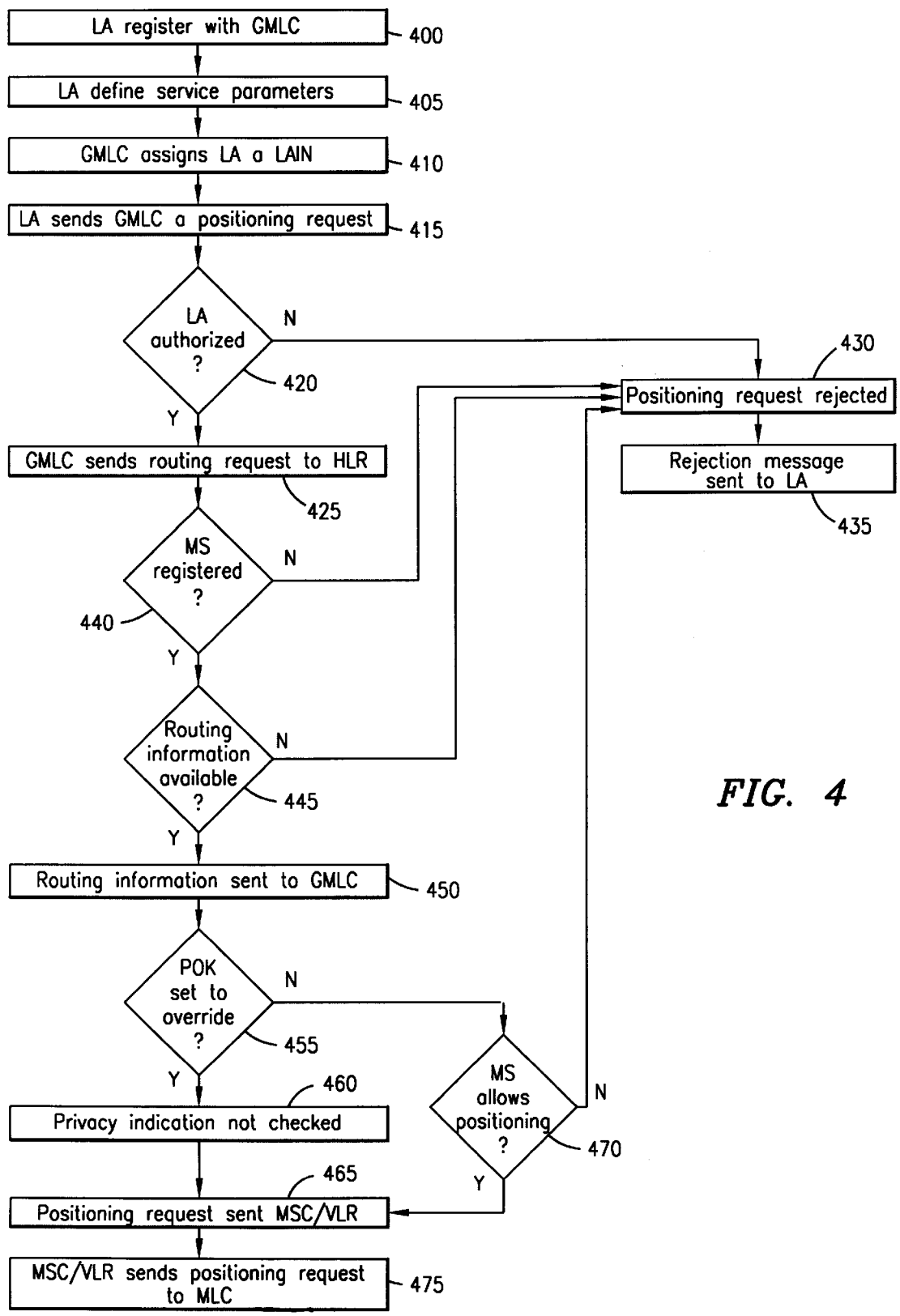
FIG. 4 demonstrates steps in a sample positioning of a mobile terminal depending upon the value of a Privacy Override Key associated with a requesting Location Application in accordance with preferred embodiments of the present invention.

With reference now to FIG. 3 of the drawings, which will be described in connection with FIGS. 4 and 5 of the drawings, prior to a Location Application (LA) 380 sending a positioning request 382 to a Gateway Mobile Location Center (GMLC) 390 (step 415), as described in copending patent application, Ser. No. 09/062,839, entitled "System and Method for Defining Location Services", filed concurrently herewith and which is hereby incorporated by reference, the LA 380 must first register with the GMLC 390 (step 400) and define within, for example, a database 395 within the GMLC 390, its location services profile (step 405), e.g., all of the relevant service parameters specific to that LA 380. One such service parameter 398 that the LA 380 can define is whether the LA 380 has the authority to override subscriber limitations and/or system default behavior when positioning. Such service parameters 398 are called Location Override Keys (LOKs) 399. Each LOK 399 can either have the value "override" or "not override". In addition, each LA 380 shall be associated with a particular value of an LOK 399, with the default setting being "not override". At registration, an LOK can be accompanied by one or more additional parameters (not shown) that carry additional information related to the particular LOK. This information can be used to further define the override capabilities. For example, a positioning method parameter can be included which defines the particular positioning method to be used when positioning.

Once the LA 380 has defined the service parameters 398 specific to that LA 380 (step 405), the GMLC 390 assigns a Location Application Identifier Number (LAIN) 386 (step 410), which identifies the particular LA 380 and the associated service parameters 398. Thereafter, the requesting LA 380 can send its LAIN 386 in a positioning request 382, specifying the particular Mobile Station International Subscriber Identity Number(s) (MSISDN) 388 associated with particular Mobile Stations (MS) 300 to be positioned (step 415) to the GMLC 390. However, if the LA 380 is an emergency center, the emergency center can define its location services 398 such that positioning can be performed on any MS 300 that dials "911", regardless of the MSISDN 388 or whether the particular MS 300 has an MSISDN 388 (in the case where service for the MS 300 has not yet been activated). In that case, when an MS 300 dials "911", a Mobile Switching Center/Visitor Location Register (MSC/VLR) 360 serving an area 305 that the MS 300 is in triggers the positioning request in a serving Mobile Location Center (MLC) 370, and positioning of the MS 300 is performed. Thus, the emergency call can be routed to the appropriate Public Safety Answering Point (PSAP) (not shown) and emergency services can be dispatched to the current location of the MS 300.

When the GMLC 390 receives the positioning request (step 415), the GMLC 390 analyzes the LAIN 386 to determine if the LA 380 is authorized to position the particular MS(s) 300 requested (step 420). If the LA 380 is authorized to position the requested MS(s) 300 (step 420), the GMLC 390 can then send a request for routing information (step 425), e.g., the address of the MSC/VLR 360 serving the PLMN 305 that the MS 300 is currently located in and positioning subscription information for the MS 300, to the MS's 300 Home Location Register (HLR) 350, using the MS's 300 directory number as a global title. The signaling network, e.g., the Signaling System #7 (SS7) network (not shown), can perform a global title translation on the MSISDN 388 and route the request to the appropriate HLR 350 for the MS 300. It should be noted that if, however, the LA 380 is not authorized to request positioning of the MS 300 (step 420), the positioning request 382 is rejected by the GMLC 390 (step 430) and a rejection message is sent to the LA 380 (step 435).

The HLR 350 then checks its records to confirm that the MS 300 is registered in the HLR 350 (step 440), and that routing information for that MS 300 is available (step 445). If the MS 300 is not registered in the HLR 350 (step 440) or the routing information is not available (step 445), the routing information request is rejected by the HLR 350 (step 430) and the GMLC 390 sends a rejection message to the LA 380 (step 435). However, if the MS 300 is registered in the HLR 350 (step 440) and routing information is available (step 445), the routing information, e.g., the serving MSC/VLR 360 address, together with the positioning subscription information, is sent to the GMLC 390 (step 450).

The GMLC 390 then checks the service parameters 398 defined by the LA 380 (step 455). For example, if one of the LOKs 399 is a privacy override key (POK) 399, which can be used by the GMLC 390 to determine whether the privacy settings of the subscriber to be positioned should be overridden for the positioning request, the GMLC 390 then determines the value of the POK 399: "override" or "not override". If the value is set to "override" (step 455), the GMLC 390 does not check the privacy indications of the MS 300 (step 460), and the positioning request along with the POK 399 of "override" is forwarded to the MSC/VLR 360 (step 465). For example, if the LA 380 is an emergency center or a law enforcement agency, the LA 380 can define its location services profile 398 (step 405) such that positioning can be performed regardless of the privacy settings of the subscriber being positioned. The particular LA's 380 allowed to override privacy settings and the conditions for doing so can be established by the network operator or local and/or national government regulations.

If, however, the POK 399 is set to "not override" (step 455), the GMLC 390 must then verify that the MS 300 to be positioned by the LA 380 allows positioning to be performed (step 470), e.g., by checking the positioning subscription information (privacy indication), sent by the HLR 350. Alternatively, the serving MSC/VLR 360 or serving MLC 370 can check the privacy indication of the MS 300. If the MSC/VLR 360 or MLC 370 normally performs the check, the POK 399 for privacy override indication is passed onto the MSC/VLR 360 or MLC 370 from the GMLC 390 along with the positioning request.

If the MS 300 does not allow positioning (step 470), the positioning request 382 is rejected (step 430) and a rejection message is sent to the LA 380 (step 435). However, if the MS 300 does allow positioning (step 470) or the privacy settings have been overridden by the POK 399 (step 460), the GMLC 390 can then send the positioning request to the serving MSC/VLR 360 (step 465), using the MSC/VLR 360 address. Thereafter, the serving MSC/VLR 360 can route the positioning request to the MLC 370 serving the PLMN 305 that the MS 300 is located in (step 475). It should be understood that the MLC 370 can be co-located with the serving MSC/VLR 360 or can be a separate node, the latter being illustrated.

Alternatively, after the GMLC 390 confirms that the MS 300 allows positioning to be performed (step 470), the GMLC 390 can derive, from the MSC/VLR 360 address, the address of the MLC 370 in the serving PLMN 305, using, for example, a look-up table (database) 395. Thereafter, the positioning request 382 can be routed directly to the MLC 370 in the serving PLMN 305 (step 465).

Figure 5:
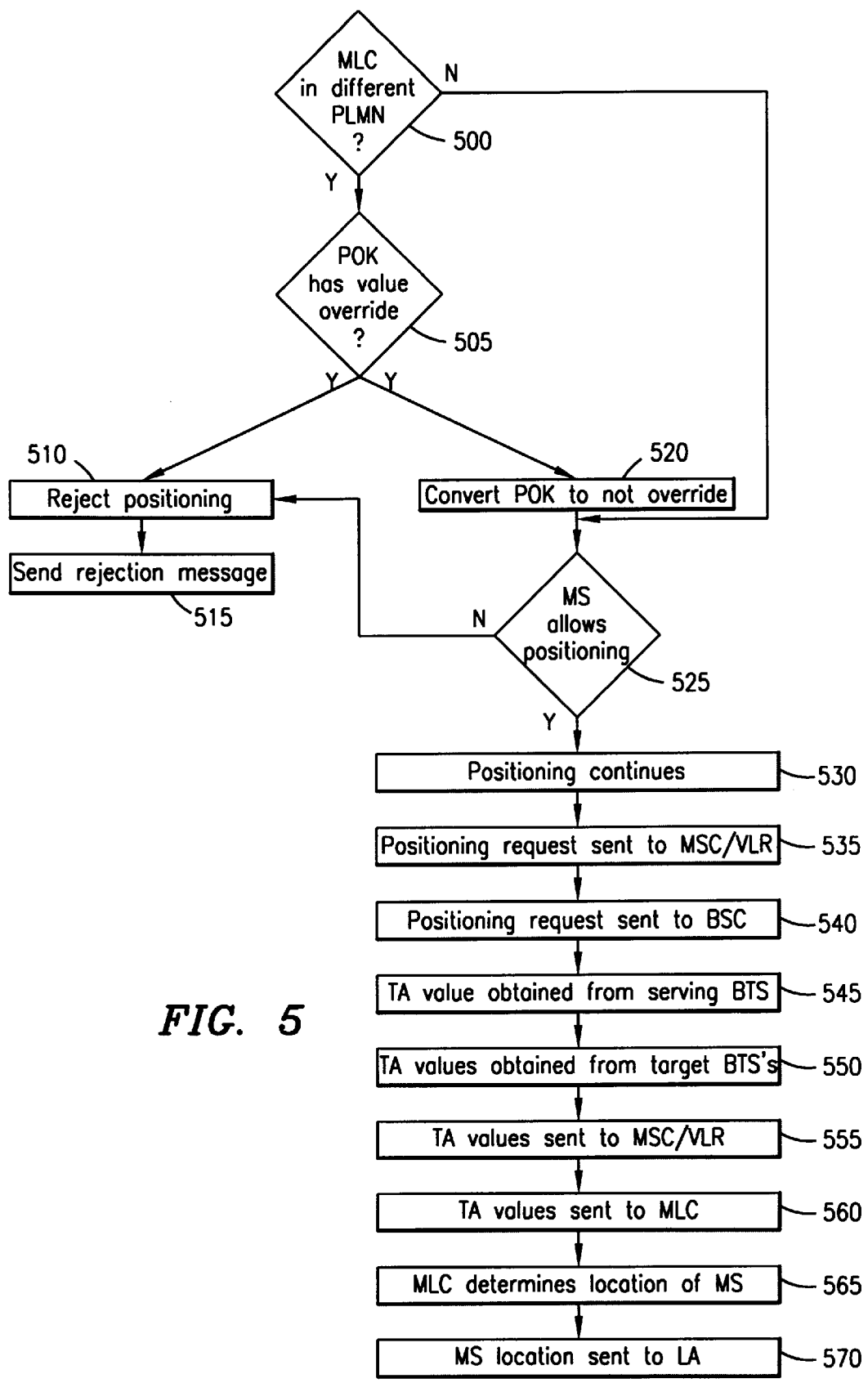

With reference now to FIG. 5 of the drawings, if the serving MSC/VLR 360 and MLC 370 are located within a PLMN 305 different from the PLMN 385 that the GMLC 390 is located in (step 500), then, if the POK 399 is sent by the GMLC 390 with the value "override" (step 505), the serving MLC 370 can either reject the positioning request 382 (step 510) and send a rejection message to the LA 380 (step 515), or convert the POK 399 to a value of "not override" (step 520). If the POK 399 is converted to "not override" (step 520), the serving MLC 370 must then check the privacy settings of the subscriber (step 525). If the subscriber's privacy settings allow positioning (step 525), positioning will continue (step 530). However, if the subscriber's privacy settings do not allow positioning (step 525), the serving MLC 370 can reject the positioning request 382 (step 510) and send a rejection message to the LA 380 (step 515). This avoids jurisdictional conflicts between PLMNs (305 and 385) with respect to the ability of LA's 380 to override privacy settings. However, it should be understood that agreements between PLMN's (305 and 385) can state that POK 399 values of "override" will be accepted between the PLMN's (305 and 385). In addition, if the LA 380 is a law enforcement agency, which has a court order allowing positioning, then the POK 399 can be accepted by the serving MLC 370 if a court order also exists at the serving MLC 370. It should be understood that a POK 399 with the value "not override" (step 505) will not be changed by the serving MLC 370 and positioning will then only occur if the subscriber's privacy settings allow it (steps 525–530).

Once the serving MLC 370 determines that positioning can continue (step 530), e.g., either the POK 399 with the value "override" is accepted (step 500) or the POK 399 is set to "not override" (step 520) and the subscriber allows positioning (step 530), the MLC 370 can then send the positioning request to the serving MSC/VLR 360 (step 535), which can then forward the positioning request to a Base Station Controller (BSC) 340 (step 540). If the MS 300 is in idle mode, the serving MSC/VLR 360 must page the MS 300 and setup a call to the MS 300 prior to forwarding the positioning request 382 to the BSC 340 (step 540). This call does not activate the ringing tone on the MS 300, and therefore, is not noticed by the MS 300.

The originating BSC 340 then determines which Base Transceiver Station (BTS) 320 is currently serving the MS 300, and obtains a Timing Advance (TA) value (TA1), or other positioning data, from this serving BTS 320 (step 545), if possible. Thereafter, TA values are obtained from at least two target BTSs (310 and 330) (step 550) by performing a positioning handover. If the serving BTS 320 does not support positioning, an additional target BTS (not shown) must be selected. It should be noted that other positioning methods can be used instead of obtaining TA values, as discussed herein. In addition, positioning of the MS 300 can be performed using more than three BTSs (310, 320, and 330).

The TA values (TA2 and TA3) measured by the target BTS's (310 and 330) are then transmitted by the serving BSC 340 to the MSC 360, together with the TA value TA1 obtained from the serving BTS 320 (step 555). Finally, the TA values (TA1, TA2 and TA3) are forwarded to the serving MLC 370 from the MSC/VLR 360 (step 560), where the location of the MS 300 is determined using the triangulation algorithm (step 565). The MLC 370 then presents the geographical position of the MS 300 to the requesting LA (node) 380 (step 570).

Advantageously, by implementing LOK(s) 399 in this manner, any cellular network (GMLC 390) can accommodate any new Location Application 380 without having to modify its internal location services or introduce any new mechanism to take into consideration authorization and privacy issues of the subscriber(s) to be positioned.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the location services can be used by applications located-in or connected-to the subscriber's MS, by network applications or by external applications.

In addition, it should be understood that other positioning methods, instead of the Timing Advance positioning method discussed herein, can be used to determine the location of the mobile terminal. For example, such positioning methods can include: Time of Arrival, Angle of Arrival, Global Positioning System, Observed Time Difference, or Enhanced Observed Time Difference.

Furthermore, it should be understood that the positioning systems and methods disclosed herein can be utilized by any cellular network, including, but not limited to the Global System for Mobile Communications (GSM) network, the Personal Communications Systems (PCS) network, the AMPS network and the D-AMPS network.

What is claimed is:

1. A telecommunications system for locating a mobile terminal within a cellular network by overriding subscriber parameters associated with said mobile terminal, said telecommunications system comprising:

a home location register in wireless communication with said mobile terminal, said home location register storing said subscriber parameters therein; and a gateway mobile location center connected to said home location register for receiving said subscriber parameters, said gateway mobile location center having a database therein for storing a location override service parameter defined by and associated with a location node in communication with said gateway mobile location center, said location node sending a positioning request to said gateway mobile location center, said gateway mobile location center processing said positioning request without checking said subscriber parameters when said location override service parameter has an override value associated therewith; and a serving mobile location center in communication with said gateway mobile location center and a mobile switching center in wireless communication with said mobile terminal, said gateway mobile location center sending said positioning request to said serving mobile location center via said mobile switching center, said serving mobile location center instructing said mobile switching center to obtain location data associated with the location of said mobile terminal and transmit said location data back to said serving mobile location center for use in calculating the location of said mobile terminal, said serving mobile location center forwarding the location of said mobile terminal to said location node.

2. The telecommunications system of claim 1, wherein said serving mobile location center is located in an additional cellular network, said gateway mobile location center sending said positioning request and said location override service parameter to said serving mobile location center.

3. The telecommunications system of claim 2, wherein said serving mobile location center converts said override value associated with said location override service parameter to a not override value, said serving mobile location center receiving said subscriber parameters from said home location register, said mobile location center not determining the location of said mobile terminal when said subscriber parameters restrict positioning of said mobile terminal.

4. The telecommunications system of claim 2, wherein said serving mobile location center rejects said positioning request and sends a rejection message to said location node when said location override service parameter has said override value.

5. The telecommunications system of claim 1, wherein said location override service parameter is a privacy override key.

6. The telecommunications system of claim 1, wherein said gateway mobile location center checks said subscriber parameters when said location override service parameter has a not override value associated therewith, said gateway mobile location center not processing said positioning request when said subscriber parameters limit positioning of said mobile terminal.

7. A method for determining the location of a mobile terminal within a cellular network by overriding subscriber parameters associated with said mobile terminal, said method comprising the steps of:

storing, within a database in a gateway mobile location center, a location override service parameter defined by and associated with a location node in communication with said mobile location center;

receiving, by said gateway mobile location center, a positioning request from said location node;

receiving, by said gateway mobile location center, said subscriber parameters from a home location register in wireless communication with said mobile terminal and in communication with said mobile location center;

forwarding, by said gateway mobile location center, said positioning request to a serving mobile location center via a mobile switching center in wireless communication with said mobile terminal without checking said subscriber parameters when said location override service parameter has an override value associated therewith;

instructing, by said serving mobile location center, said mobile switching center to obtain location data associated with the location of said mobile terminal;

calculating, by said serving mobile location center, the location of said mobile terminal using said location data; and forwarding, by said serving mobile location center, the location of said mobile terminal to said location node.

8. The method of claim 7, wherein said serving mobile location center is located in an additional cellular network, and wherein said step of forwarding further comprises the step of:

sending, by said gateway mobile location center, said positioning request and said location override service parameter to said serving mobile location center.

9. The method of claim 8, further comprising, after said step of sending said positioning request and said location override service parameter, the steps of:

converting, by said serving mobile location center, said override value associated with said location override service parameter to a not override value; and receiving, by said serving mobile location center, said subscriber parameters from said home location register, said step of determining the location of said mobile terminal not being performed when said subscriber parameters restrict positioning of said mobile terminal.

10. The method of claim 8, further comprising, after said step of sending said positioning request and said location override service parameter, the steps of:

rejecting, by said serving mobile location center, said positioning request; and sending, by said serving mobile location center, a rejection message to said location node when said location override service parameter has said override value.

11. The method of claim 7, wherein said location override service parameter is a privacy override key.

12. The method of claim 7, further comprising, before said step of forwarding, the step of:

checking, by said gateway mobile location center, said subscriber parameters when said location override service parameter has a not override value associated therewith, said step of forwarding not being performed when said subscriber parameters limit positioning of said mobile terminal.

* * * * *